F. E. GALE.
ANTISLIPPING ATTACHMENT FOR AUTOMOBILE WHEELS.
APPLICATION FILED FEB. 12, 1918.
1,303,651. Patented May 13, 1919.
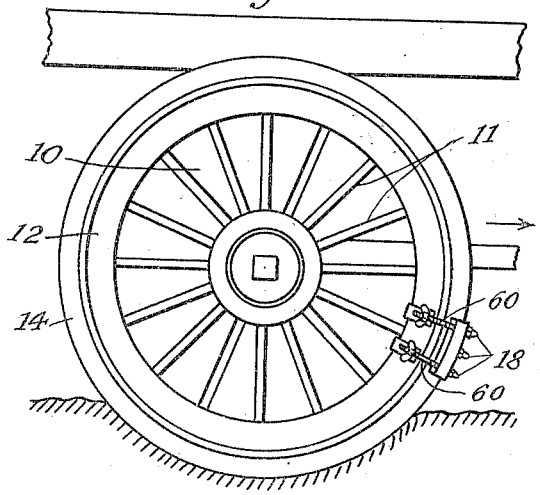
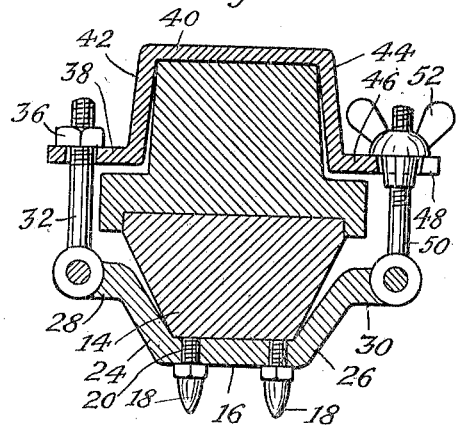
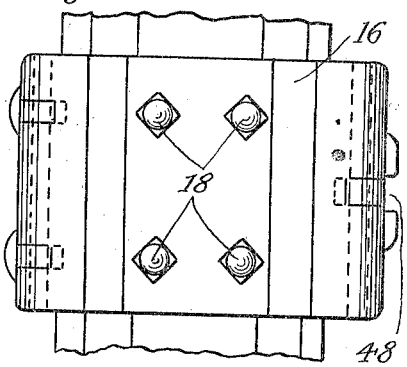
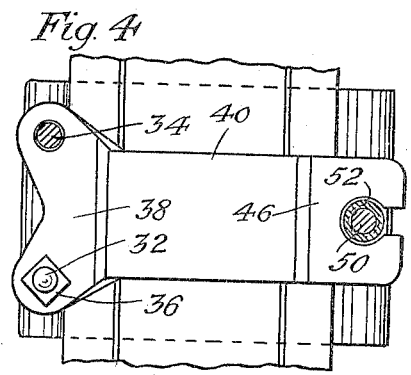
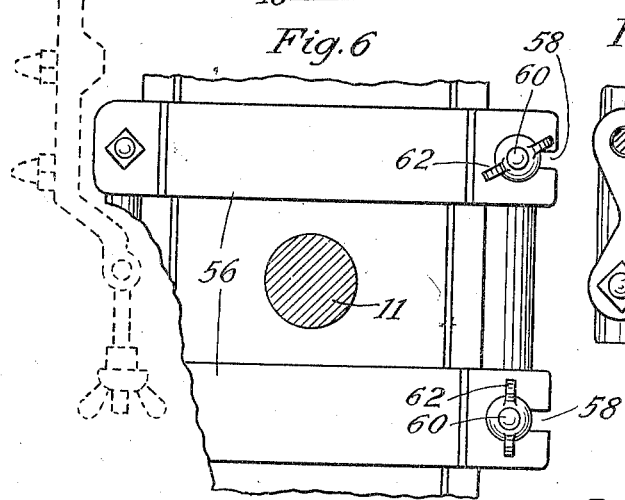
Inventor:
Fred E. Gale
By Whiteley and Ruckman
his Attorneys.

UNITED STATES PATENT OFFICE.

FRED E. GALE, OF MINNEAPOLIS, MINNESOTA.

ANTISLIPPING ATTACHMENT FOR AUTOMOBILE-WHEELS.

1,303,651.  Specification of Letters Patent.  Patented May 13, 1919.

Application filed February 12, 1918. Serial No. 216,821.

*To all whom it may concern:*

Be it known that I, FRED E. GALE, a citizen of the United States, residing at Minneapolis, in the county of Hennepin and State of Minnesota, have invented certain new and useful Improvements in Antislipping Attachments for Automobile-Wheels, of which the following is a specification.

My invention relates to anti-slipping attachments for automobile wheels which are intended in particular to be applied to the driving wheels of automobiles and trucks having solid tires as distinguished from pneumatic tires. In the use of such vehicles, particularly heavy auto trucks, on soft or muddy ground, or in winter when there is snow or ice on the ground, it is often found that the traction of the driving wheels is inefficient. When this condition exists the wheels slip and spin around without moving the vehicle, particularly when an attempt is made to start the same. The object of my invention is to provide a device which will obviate this difficulty, and I accomplish this object by attaching to the tire and felly a metal shoe having a plurality of calks extending outside of the tread of the tire. A further object is to provide a plurality of calks which can be readily detached when worn and replaced with new calks. A further object is the provision of a shoe attachment of this character which can be quickly and easily attached and detached.

The full objects and advantages of my invention will be apparent from the detailed description thereof.

In the drawings, illustrating the application of my invention,

Figure 1 is a side view of a power drive wheel showing my improved anti-slipping attachment in place. Fig. 2 is an enlarged view in cross-section through the tire and wheel rim with the attachment in place thereon. Fig. 3 is a view of the outward side of the attachment. Fig. 4 is a view of the inward side of the attachment with two of the securing bolts shown in cross section. Fig. 5 is a view in cross section of a modified form. Fig. 6 is a view of a further modification showing the inward side of the attachment.

In the drawings 10 indicates one of the drive wheels of an auto truck having the customary spokes 11, felly 12 and solid rubber tire 14. The attachment comprises a metal plate 16 preferably slightly curved to conform to the tread of the tire, and provided with a plurality of detachable calks 18. These calks are shown as four in number and they have screw-threaded inner ends adapted to be screwed into screw-threaded openings in the plate as shown in Fig. 2. The sides of the plate 16 are bent inwardly at 24 and 26 and outwardly at 28 and 30. Pivotally attached to the portion 28 are two bolts 32 and 34 screw-threaded at their inner ends to receive nuts 36. The bolts 32 pass loosely through holes in the flange 38 formed on a plate 40 adapted to be passed over the felly and connected to the flange 38 by the connecting portion 42. The other side of the plate has a connecting portion 44 connecting with a flange 46. In the outer edge of this flange is a slot 48 for receiving a bolt 50 pivoted to the flange 30 and adapted to be swung to enter the slot and be secured in place by a thumb nut 52 for holding the attachment firmly in place on the felly and tire. Fig. 4 shows the bolt 34 and the wing nut 52 in section.

Fig. 5 shows a slight modification for use on a tire having a double tread, in which the plate 16 is provided with a lug 54 to extend between the two portions of the tread. Otherwise the construction may be the same as that shown in Fig. 2. In Fig. 5 the plate 16 is shown in dotted lines as detached from the tire and swung down into disengaging position.

Fig. 6 shows a further modification in which the single member 40 is replaced by two narrow members or straps 56 each having a slot 58 to receive bolts 60 pivoted to the outer plate member and secured by wing nuts 62. In this form of invention the two straps are adapted to straddle a spoke 11. It is evident that the securing means shown in this figure can be used either with the form shown in Figs. 2 and 4 or with that shown in Fig. 5.

The operation and advantages of my attachment will be obvious from the foregoing description. When the vehicle becomes stalled on account of the drive wheels spinning on soft or slippery surfaces, the attachment may be quickly applied to the drive wheels and the engagement of the calks with such surfaces will cause the wheels to take hold and start the vehicle. When the attachment is not required it is easily detached by loosening the thumb nut 52, whereupon the plate member 16 may be swung away from the tire, as shown in dotted lines in Fig. 5, and the attachment removed as an entirety from the wheel. It is particularly advantageous to provide calks which can readily be removed when worn and replaced by new calks.

I claim:

An anti-slipping attachment for vehicle wheels comprising a rigid calk carrying member adapted to fit upon the tire with its length extending transversely thereof, a rigid member adapted to fit upon the felly with its length extending transversely thereof, said members having their ends provided with flanges offset toward each other, bolts pivotally attached to one flange of said calk carrying member, means for securing said bolts to the corresponding flange of the other member, a bolt pivotally attached to the other flange of said calk carrying member and adapted to enter a slot in the corresponding flange of the other member and a thumb nut adapted to secure said last mentioned bolt to said last mentioned flange.

In testimony whereof I hereunto affix my signature.

FRED E. GALE.

Copies of this patent may be obtained for five cents each, by addressing the "Commissioner of Patents, Washington, D. C."